United States Patent [19]
Lee

[11] Patent Number: 5,353,878
[45] Date of Patent: Oct. 11, 1994

[54] HORSESHOES AND METHOD FOR THEIR PREPARATION

[75] Inventor: Byung S. Lee, Seoul, Rep. of Korea

[73] Assignee: Nova Horseshoe Co., Ltd., Seoul, Rep. of Korea

[21] Appl. No.: 990,788

[22] Filed: Dec. 11, 1992

[30] Foreign Application Priority Data

Dec. 12, 1991 [KR] Rep. of Korea ............... 91-22096
Apr. 22, 1992 [KR] Rep. of Korea ............... 92-6709
Oct. 20, 1992 [KR] Rep. of Korea ............... 92-19266

[51] Int. Cl.⁵ .................... A01L 1/00; A01L 7/02
[52] U.S. Cl. .................... 168/13; 168/DIG. 1
[58] Field of Search ............ 168/4, 13, DIG. 1

[56] References Cited

U.S. PATENT DOCUMENTS

| | | | |
|---|---|---|---|
| 2,067,427 | 1/1937 | Swanstrom | 168/13 |
| 5,105,891 | 4/1992 | Noffsinger | 168/13 |
| 5,205,362 | 4/1993 | Noffsinger | 168/13 |

FOREIGN PATENT DOCUMENTS

616692 8/1935 Fed. Rep. of Germany ........ 168/13

*Primary Examiner*—Robert P. Swiatek
*Attorney, Agent, or Firm*—Vidas, Arrett & Steinkraus

[57] ABSTRACT

A horseshoe having a shock absorbing layer and a metal frame which are tightly coupled to each other due to protrusions and depressions. The shock absorbing layer has an arc-shaped protrusion formed at its bottom front, a plurality of uniformly spaced small protrusions formed on opposite side arms of the layer, a pair of circular protrusions downwardly formed on both ends of the layer. The metal frame has first and second protrusions downwardly longitudinally extending from its lower surface throughout its length, a center protrusion being formed between the first and second protrusions, a first depression being provided between the first and center protrusions, a second depression provided between the second and center protrusions and having a tapered shape. The metal frame further includes a plurality of nail driving holes, a plurality of nonslip ribs for preventing relative slip of the metal frame with respect to the horse's hoof and a rugged surface for permitting a nailhead of the nail to become engaged therewith in order to prevent the horseshoe form being loosen. This rugged surface is formed on an inner surface of the second protrusion.

11 Claims, 5 Drawing Sheets

FIG.1

(PRIOR ART)

HORSESHOES AND METHOD FOR THEIR PREPARATION

BACKGROUND OF THE INVENTION

Field of the Invention

The present invention relates in general to an improvement of horseshoes, and more particularly to a horseshoe in which the coupling force between a metal part and a shock absorbing part made of resin is improved in order to increase the structural strength and using life of the horseshoe and it is possible to maintain a stable coupling state of the horseshoe to a horse's hoof for a long time. The present invention also provides a method for preparation of such a horseshoe.

Background of the Prior Art

Conventionally, it is noted that the horse's hoofs are the life and soul of the horses, particularly racing horses, and racing horse's naked hoofs' are generally worn down to an extent of about 4 mm in a race. In this respect, the horse's hoof is necessarily shod, regardless of use of the horse, with a horseshoe preferably made of metal and rubber for preventing wear and tear of its hoof. This horseshoe has an intrinsic U-shaped appearance corresponding to the outer shape of the horse's hoof.

Figure 1:
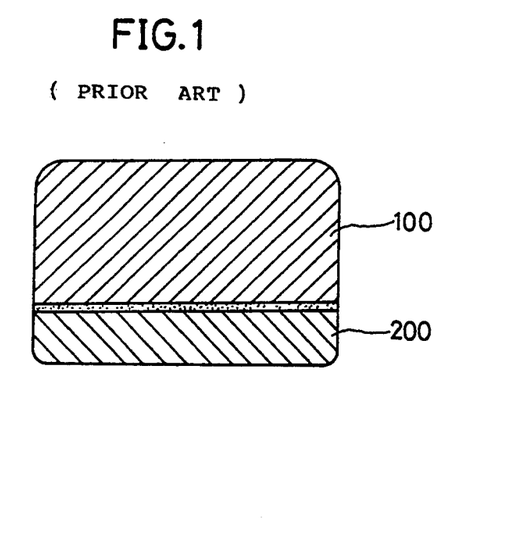
FIG. 1 is a sectioned view of a known horseshoe.

With reference to FIG. 1 which is a reversed sectioned view of a known horseshoe, this known horseshoe has a rubber part 100 and a metal part 200, the former constituting a bottom layer of the horseshoe and being simply bonded to the lower surface of the latter by an adhesive.

However, this known horseshoe has a problem in that it is required to substitute new horseshoe at every one week and, furthermore, the rubber part 100 easily comes off the metal part 200 during racing since the bonding force therebetween is not sufficient.

SUMMARY OF THE INVENTION

It is, therefore, an object of the present invention to provide an improved horeseshoe in which the above problem can be overcome by providing several types of protrusions on the bottom surface of a metal part and improving the coupling force between the metal part and a shock absorbing part coupled to a lower rugged surface of the metal part.

It is another object of the present invention to provide a method for preparation of such a horseshoe.

In an aspect, the present invention provides a horseshoe comprising: a shock absorbing layer constituting a bottom layer of said horseshoe and being adapted to absorb shock generated in racing of a horse, said shock absorbing layer being made of a shock absorbing material and including a plurality of protrusions on its bottom surface in order to improve abrasion resistance thereof; and a metal frame for coming into direct contact with a horse's hoof, said metal frame being coupled to an upper surface of said shock absorbing layer and including on its lower surface a plurality of protrusions providing depressions therebetween, said protrusions and depressions improving the coupling force between said shock absorbing layer and said metal frame.

In another aspect, the present invention provides a method for preparation of a horseshoe comprising the steps of: extruding a long straight metal frame which is to be formed into said metal frame; forming said nail driving holes, protrusions and depressions on said long straight metal frame; cutting said long straight metal frame into several pieces having a predetermined length; bending one of said metal frame pieces twice in order to form said piece into said metal frame; sanding and washing said metal frame using sand and noninflammable detergent, thereafter, drying said metal frame; applying an adhesive to said lower surface of the metal frame which is in turn dried; and laying a shock absorbing material gel of said shock absorbing layer on said lower surface of the metal frame and compression-molding said material along with said metal frame at a high temperature of about 150° C.~160° C. and a high pressure of about 150 Kg/cm$^2$ for 10~20 minutes.

BRIEF DESCRIPTION OF THE DRAWINGS

The above and other objects, features and other advantages of the present invention will be more clearly understood from the following detailed description taken in conjunction with the accompanying drawings, in which:

FIGS. 3A and 3B show in detail the embodiment of FIG. 2, respectively, in which:

DETAILED DESCRIPTION OF THE PREFERRED EMBODIMENTS

Figure 2:
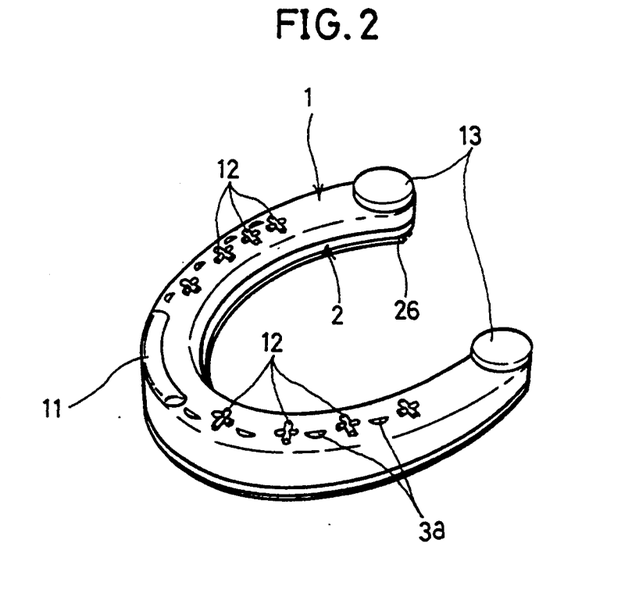
FIG. 2 is a perspective bottom view of an embodiment of a horseshoe in accordance with the present invention.
Figure 3A:
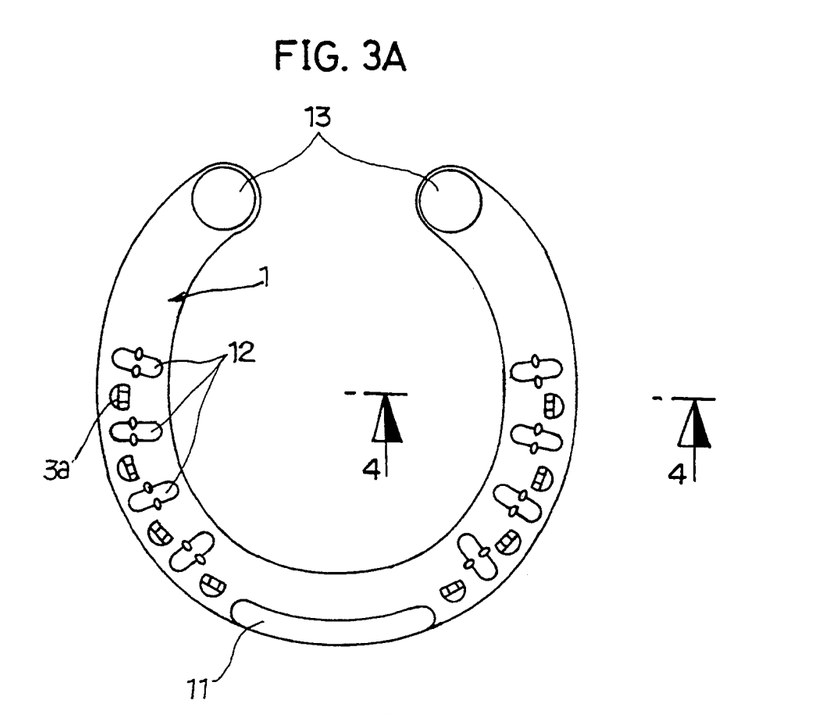
FIG. 3A is a bottom view of a shock absorbing layer of the horseshoe.
Figure 3B:
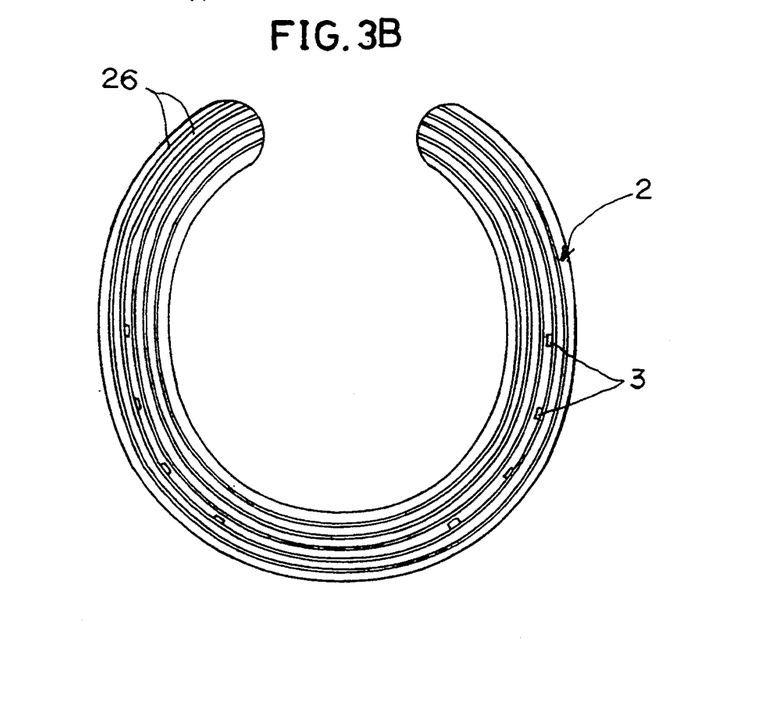
FIG. 3B is a plane view of a metal frame of the horseshoe.

Referring now to FIGS. 2, 3A and 3B showing an embodiment of a horseshoe in accordance with the present invention, respectively, the horseshoe includes a shock absorbing layer 1 which constitutes a bottom layer of the horseshoe and is made of a shock absorbing material, preferably vulcanized rubber, soft polyvinyl chloride(PVC) or urethane resin. This shock absorbing layer 1 (hereinafter, referred to simply as "the bottom layer") is integrally provided at its bottom surface with an arc-shaped protrusion 11 and a plurality of uniformly spaced small protrusions 12. The arc-shaped protrusion 11 is disposed at the front of the bottom layer 1 while the small protrusions are disposed on opposite side arms of the bottom layer 1. This bottom layer 1 further includes a pair of circular protrusions 13 which are downwardly formed on both ends of the layer 1.

The horseshoe further includes a metal frame 2 which is coupled to an upper surface of the bottom layer 1. As shown in detail in FIG. 4, this metal frame 2 has a pair of longitudinal protrusions, that is, first and second protrusions 21 and 21' which are downwardly longitudinally extended from its U-shaped bottom surface throughout its length. These protrusions 21 and 21' are slightly inclined outwards, respectively, and the second protrusion 21' is rugged on its inside surface in order to provide a rugged surface 25. Between the pair of protrusions 21 and 21', the metal frame 2 further includes first and second depressions 23 and 24 which are separated from each other by a center protrusion 22 which is slightly inclined to the first protrusion 21. Here, the second and center protrusions 21' and 22 are inclined in opposite directions and this causes the second depression 24 provided therebetween to have a trapezoidal shape. In addition, each longitudinal protrusion 21 or 21' has a bead which is formed at its end throughout its length. Here, the bead of the first protrusion 21 is provided by swelling both sides of the longitudinal protrusion end, while the bead of the second protrusion 21' is provided by swelling only the outer side of the protrusion end. In the same manner, the center protrusion 22 has a bead which is swollen toward the first protrusion 21 and, as a result, there is provided a narrow mouth 21a of the first depression 23 between the beads of the first and center protrusions 21 and 22. In addition, the metal frame 2 has a plurality of uniformly spaced nail driving holes 3 which are formed along the second depression 24 which has the trapezoidal shape, generally corresponding to the outer shape of the nailhead. Suitably, the protrusions 21 and 21' are spaced inwardly from the edges of metal frame 2 to form additional depressions 40, 41.

Figure 4:
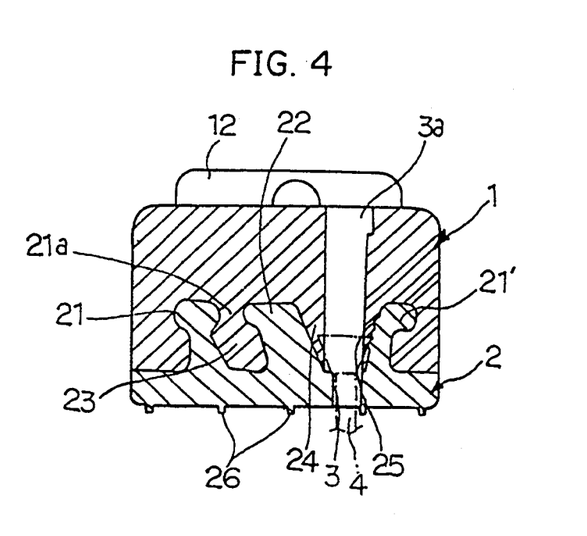
FIG. 4 is a sectioned view taken along the section line 4—4 of FIG. 3A.

As a result, the metal frame 2 has on its lower surface three coupling rails which comprise the three protrusions 21, 21' and 22 and are adapted to promote the tight coupling of this metal frame 2 to the bottom layer 1.

In order to permit the nails 4 to be driven through the nail driving holes 3 of the metal frame 2 when the metal frame 2 is coupled to the bottom layer 1, the bottom frame 1 has a plurality of through holes 3a corresponding to the nail driving holes 3 of the metal frame 2.

Turning to FIG. 3B, the metal frame 2 has a plurality of nonslip ribs 26 on its upper surface which are to come into direct contact with the bottom of the horse's hoof.

In this regard, it is possible to prevent relative slip between the horseshoe and the horse's hoof.

In use, this horseshoe is shod to a horse's hoof by driving the nails 4 through the holes 3a and 3 under the condition that the nonslip ribs 28 of the metal frame penetrate the bottom of the horse's hoof in order to prevent relative slip between the horseshoe and the horse's hoof. When the nail 4 is driven into the horse's hoof in order to shoe the horse as described above, the nailhead crushes a part of the bottom layer 1 around the through hole 3a and strongly gets in the rugged surface 25 of the second protrusion 21' with the crushed bottom layer material jammed therebetween. In this regard, the nail 4 provides sufficient coupling force between the horseshoe and the horse's hoof and this efficiently prevents loosening of the horseshoe with respect to the horse's hoof in use of this horseshoe.

Figure 5:
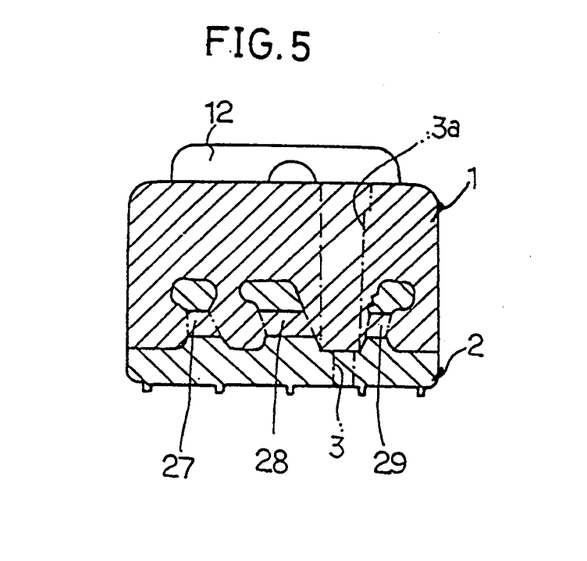
FIG. 5 is a view corresponding to FIG. 4, but showing another embodiment of a horseshoe in accordance with the present invention.

In addition, the coupling force between the bottom layer 1 and the metal frame 2 made of different materials is improved by virtue of the characteristic shapes of the first and second protrusions 21 and 21' as well as that of the first depression 23 provided between the first protrusion 21 and the center protrusion Since the bottom layer 1 has a rugged bottom structure due to the arc-shaped protrusion 11, the plurality of small protrusions 12 and the pair of circular protrusions 13, the protrusions 11, 12, and 13 are worn down prior to abrasion of the main body of this bottom layer 1 when the bottom surface of this layer 1 comes into contact with the ground surface during the racing of the horse. In this respect, the useful life of this horseshoe is desirably increased due to the lengthened useful life of the bottom layer 1. In addition, the bottom layer 1 is prevented from local abrasion and improves its strength because the protrusions 11, 12, and 13 provide a uniformly rugged structure for the bottom surface of this layer Turning to FIG. 5 showing another embodiment of a horseshoe of this invention, it is noted that the general shape of this embodiment remains the same as in the primary embodiment of FIG. 4, but the protrusions 21, 21' and 22 are altered to improve the coupling force between the bottom layer 1 and the metal frame 2. Otherwise stated, the protrusions 21, 21' and 22 of this embodiment are formed with lateral through holes 27, 28 and 29, respectively, in order to be filled with the bottom layer material, such as vulcanized rubber, soft PVC or urethane resin, when the bottom layer 1 is formed in order to be coupled to the lower surface of the metal frame 2. Due to such a construction of this embodiment, the coupling force between the two parts 1 and 2 is more improved in comparison with the primary embodiment of FIG. 4.

The present invention also provides a novel method for preparation of the horseshoes which is suitable for mass production. If generally described, the present preparation method comprises, in contrast to the conventional metal plate casting method for preparation of the known horseshoes, an extruding step for preparing a long straight metal frame followed by a forming step for providing the first and second depressions 23 and 24 together with the plurality of uniformly spaced nail driving holes 3 for the long metal frame. Here, the forming of the depressions 23 and 24 results in provision of the three protrusions 21, 21' and 22 on the long metal frame. Thereafter, this long metal frame is cut into several pieces having a predetermined length of about 30cm. Each of the metal frame piece is then bent two times by a bending machine or a press in order to have an intrinsic shape of the horseshoe and in turn subjected to a surface finish sanding and washing step. Thus, the desired metal frame 2 is prepared. The resulting metal frame 2 is, thereafter, applied on its rugged lower surface with an adhesive and subjected to a bottom layer molding step wherein the bottom layer material gel is laid on the metal frame and compression-molded at a high temperature and a high pressure and, as a result, the bottom layer is tightly coupled to the metal frame in order to prepare the desired horseshoe. At this time, the depressions 23 and 24 and the lateral through holes 27 to 29 are completely filled with the bottom layer material and this causes the coupling force between the bottom layer 1 and the metal frame 2 to be improved to a predetermined extent.

Hereinafter, the preparation method of this invention will be described in detail in conjunction with the accompanying drawings, FIGS. 6 and 7.

Figure 6:
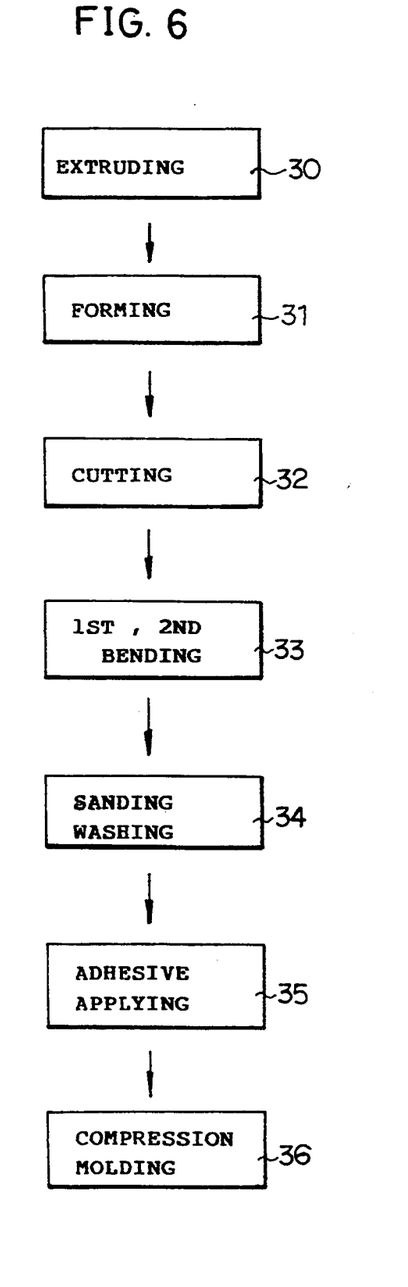
FIG. 6 is a block diagram showing the preparation steps of a horseshoe in accordance with the present invention.
Figure 7:
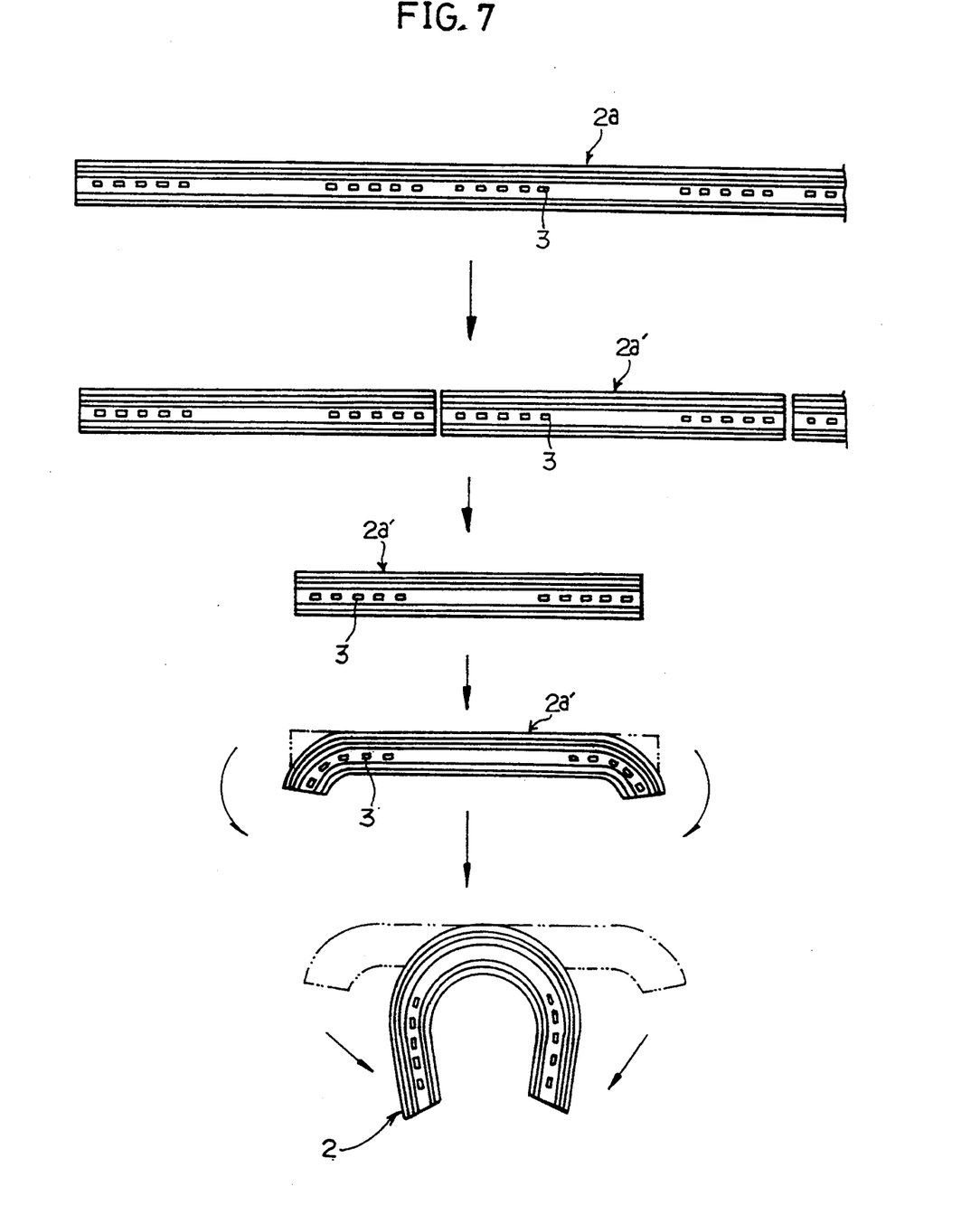
FIG. 7 is a view showing a sequential process for preparing the metal frame from a metal frame extruding step to a second bending step in accordance with the present invention.

Referring to FIGS. 6 and 7, FIG. 6 is a block diagram showing the steps of the preparation method of the horseshoes and FIG. 7 shows a sequential process from a metal frame extruding step to a second bending step of the metal frame 1. As depicted in these drawings, the extruding step 30 is first carried out in order to prepare a long straight metal frame 2a having a predetermined length of about 4 m. This extruding step 30 is followed by the forming step 31 for providing the first and second depressions 23 and 24 together with the plurality of uniformly spaced nail driving holes 3 for the metal frame 2a. In this forming step 31, the lateral through holes 27 to 29 having circular or oval shape may be preferably formed by laterally drilling or punching the protrusions 21, 21' and 22, respectively, when they are required to be provided on the frame 2a such as in the case of the another embodiment of FIG. 5. In addition, the forming of the depressions 23 and 24 results in provision of the three protrusions 21, 21' and 22 on the metal frame 2a. Thereafter, the cutting step 32 is carried out in order to cut, using a cutter or a press, this metal frame 2a into several metal pieces 2a' having the predetermined length of about 30 cm. Each of the metal frame piece 2a' is bent two times in order to have the intrinsic shape of the horseshoe in the double bending step 33. In this bending step 33, the metal piece 2a' is first bent by bending both ends thereof at a predetermined bending angle using a bending machine or a press. The first bent metal piece 2a' is then second bent, using the bending machine or the press, in order to have the intrinsic shape of the horseshoe, thereby preparing the metal frame 2 of the horseshoe. In the aforementioned steps for the metal frames 2, one metal frame 2 can be prepared at every 5 seconds (or 120 frames/min.).

The metal frame 2 is in turn subjected to the surface finish sanding and washing step 34 in order to remove foreign substances, such as sands, from the metal frame 2. In this step 34, the sanding is carried out in order to finish the metal frame surface and, as a result, to improve affinity of the adhesive to the metal frame surface. In order to wash the metal frame 2, this metal frame 2 is sunk in a diluted solution of noninflammable detergent and in turn vibrated at a predetermined vibration velocity and a vibration period.

Here, it is preferred to select the detergent from appropriate chemicals in consideration of environmental pollution and fire, and more particularly, the metal frame 2 is most preferably washed by a steam washing technique.

After the sanding and washing step 34, the metal frame 2 is dried in order to remove moisture therefrom and in turn applied on its rugged lower surface with a chemical adhesive in the adhesive applying step 35. This adhesive is applied to the metal frame 2 in order to improve the coupling force between the metal frame 2 and the bottom layer 1 which will be formed on and coupled to the lower surface of frame 2 in the following forming step.

Thereafter, the resulting metal frame 2 may be preferably exposed to a natural drying wind at room temperature for about 20~30 minutes in order to be completely dried. Otherwise, this metal frame may be forcedly dried, using a motor fan, for about 5~10 minutes.

This drying step is followed by the bottom layer molding step 36 wherein a bottom layer material gel, such as vulcanized rubber, urethane or soft PVC gel, is simply laid on the metal frame 2 in a mold and in turn compression-molded at a high temperature of about 150° C.~160° C. and a high pressure of about 150 Kg/cm² for 10~20 minutes. As a result, the bottom layer 1 is provided by being coupled to the metal frame in order to prepare the desired horseshoe.

In this molding step 36, the bottom layer material gel on the frame 2 is slowly melted and fills both the depressions 23 and 24 and the lateral holes 27 to 29 and, at this state, is solidified in order to provide the bottom layer 1 on the lower surface of the metal frame 2 as shown in FIGS. 4 and 5. At this time, the adhesive applied to the metal frame 2 bonds the bottom layer 1 to the metal frame 2 and, in this respect, improves the coupling force between the bottom layer 1 and the metal frame 2 of the horseshoe.

As described above, a shock absorbing layer or a bottom layer of the present horseshoe is tightly coupled to the lower rugged surface of the metal frame as if it was integrally formed with the metal frame and, in this respect, improves the coupling force between the bottom layer and the metal frame. In addition, the bottom layer is provided on the metal frame by high-temperature and high-pressure compression molding and this improves strength and endurance of the horseshoe and in turn causes the abrasion resistance of the bottom layer to be improved. The metal frame of this horseshoe has a rugged surface about its nail driving hole and a plurality of nonslip ribs on its upper surface. Due to such a construction, the coupling force and the coupling state of the horseshoe with respect the horse's hoof is improved. Hence in this horseshoe, it is possible to substitute a new one only every 25~30 days and this increases the useful life of the horseshoe, Also, the improved strength of the shock absorbing layer of this horseshoe increases the running power of the horse, Furthermore, another advantage of this horseshoe is that reliability and endurance of the horseshoe are improved.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A horseshoe comprising:
    a shock absorbing layer constituting a bottom layer of said horseshoe and being adapted to absorb shock generated in racing of a horse, said shock absorbing layer being made of a shock absorbing material and including a plurality of protrusions on its bottom surface in order to improve abrasion resistance thereof; and
    a metal frame for directly contacting a horse's hoof, said metal frame being coupled to an upper surface of said shock absorbing layer and including on its lower surface a plurality of protrusions providing depressions therebetween, said protrusions and depressions improving the coupling force between said shock absorbing layer and said metal frame, wherein said protrusions of the metal frame comprise:
    first and second protrusions which are downwardly longitudinally extended from said lower surface of the metal frame throughout its length, said first and second protrusions being slightly inclined outwards, respectively; and
    a center protrusion being formed between said first and second protrusions, and
    said depressions of the metal frame comprise:
    a first depression which is provided between said first and center protrusions, said first depression having a narrow mouth and being filled with the material of said shock absorbing layer; and a second depression which is provided between said second and center protrusions, said second depression having a tapered shape.

2. A horseshoe according to claim 1, wherein said protrusions of the shock absorbing layer comprise:
an arc-shaped protrusion which is formed at the front of said bottom surface;
a plurality of uniformly spaced small protrusions which are formed on bottom surfaces of opposite side arms of said layer; and
a pair of circular protrusions which are downwardly formed on both ends of said layer.

3. A horseshoe according to claim 1, wherein said shock absorbing layer further includes a plurality of through holes for permitting nails to pass therethrough when said nails are driven into the horse's hoof in order to couple said horseshoe to said horse's hoof.

4. A horseshoe according to claim 1, wherein said metal frame further comprises:
a plurality of nail driving holes formed in said second depression and a plurality of through holes in said shock absorbing layer aligned therewith;
a plurality of nonslip ribs for preventing relative slip of said metal frame with respect to the horse's hoof, said nonslip ribs being formed on an upper surface of said metal frame; and
a rugged surface formed on an inner surface of said second protrusion, said rugged surface oriented to permit a nailhead of a nail inserted through a nail driving hole to become engaged therewith so as to prevent said horseshoe from being loosened.

5. A horseshoe according to claim 1, wherein said protrusions of the metal frame are formed with lateral through holes which are filled with the shock absorbing material of said shock absorbing layer and improve the coupling force between said shock absorbing layer and said metal frame.

6. A horseshoe according to claim 1, wherein said shock absorbing material is selected from the group consisting of a vulcanized rubber, a soft polyvinyl chloride and a urethane resin.

7. A horseshoe comprising:
a shock absorbing layer constituting a bottom layer of said horseshoe and being adapted to absorb shock generated in racing of a horse, said shock absorbing layer being made of a shock absorbing material and including a plurality of protrusions on its bottom surface in order to improve abrasion resistance thereof, said protrusions of the shock absorbing layer comprising an arc-shaped protrusion which is formed at the front of said bottom surface and a pair of circular protrusions which are downwardly formed on both ends of said layer, and
a metal frame for directly contacting a horse's hoof, said metal frame being coupled to an upper surface of said shock absorbing layer and including on its lower surface three types of protrusions providing two types of depressions therebetween with a plurality of nail holes formed in one of said two types of depressions, whereby nails may be driven through said metal frame, the material of said shock absorbing layer filling said depressions so that said protrusions and depressions improve the coupling force between said shock absorbing layer and said metal frame.

8. A horseshoe as in claim 7 wherein said three types of protrusions of the metal frame comprise:
first and second protrusions which are downwardly longitudinally extended from said lower surface of the metal frame throughout its length, said first and second protrusions being slightly inclined outwards, respectively; and
a center protrusion being formed between said first and second protrusions, and
said two types of depressions of the metal frame comprise:
a first depression which is provided between said first and center protrusions, said first depression having a narrow mouth; and
a second depression which is provided between said second and center protrusions, said second depression having a tapered shape, and the metal frame being provided with an additional pair of depressions, one of said additional pair located between the first protrusion and a first outer edge of the metal frame and the other of said additional pair of depressions located between the second protrusion and a second outer edge of the metal frame.

9. A horseshoe according to claim 8, wherein said metal frame further comprises:
a plurality of nail driving holes formed in said second depression and a plurality of through holes in said shock absorbing layer aligned therewith;
a rugged surface formed on an inner wall of said second protrusion oriented to permit a nailhead of a nail inserted through said nail driving holes to become engaged therewith so as to prevent said horseshoe from being loosened; and
a plurality of longitudinal ribs for preventing relative slip of said metal frame with respect to the horse's hoof, said longitudinal ribs being formed on the upper surface of the metal frame.

10. A horseshoe according to claim 7, wherein each of said three types of protrusions on said metal frame include a plurality of securing holes through the walls thereon, the holes being filled with the shock absorbing material of said shock absorbing layer to further improve the coupling force between the shock absorbing layer and said metal frame.

11. A horseshoe according to claim 7, wherein said shock absorbing material is selected from the group consisting of a vulcanized rubber, a soft polyvinyl chloride and a urethane resin.

* * * * *

UNITED STATES PATENT AND TRADEMARK OFFICE
CERTIFICATE OF CORRECTION

PATENT NO. : 5,353,878
DATED : October 11, 1994
INVENTOR(S) : BYUNG S. LEE

It is certified that error appears in the above-indentified patent and that said Letters Patent is hereby corrected as shown below:

Col. 3, line 64, after "protrusion" insert -- 22.--

Signed and Sealed this

Seventeenth Day of January, 1995

Attest:

BRUCE LEHMAN

*Attesting Officer*     *Commissioner of Patents and Trademarks*